(12) United States Patent
Tardy

(10) Patent No.: US 9,425,624 B2
(45) Date of Patent: Aug. 23, 2016

(54) ELECTRICAL NETWORK OF AN AIRCRAFT AND METHOD OF OPERATION OF THE ELECTRICAL NETWORK

(75) Inventor: Alain Tardy, Paris (FR)

(73) Assignee: Thales, Courbevoie (FR)

(*) Notice: Subject to any disclaimer, the term of this patent is extended or adjusted under 35 U.S.C. 154(b) by 789 days.

(21) Appl. No.: 13/392,065

(22) PCT Filed: Aug. 24, 2010

(86) PCT No.: PCT/EP2010/062301
§ 371 (c)(1),
(2), (4) Date: Sep. 5, 2012

(87) PCT Pub. No.: WO2011/023678
PCT Pub. Date: Mar. 3, 2011

(65) Prior Publication Data
US 2012/0326497 A1    Dec. 27, 2012

(30) Foreign Application Priority Data
Aug. 25, 2009   (FR) ...................................... 09 04047

(51) Int. Cl.
| | |
|---|---|
| *B60L 1/00* | (2006.01) |
| *H02J 4/00* | (2006.01) |
| *F03D 9/00* | (2016.01) |
| *B60R 16/03* | (2006.01) |
| *B64D 47/00* | (2006.01) |
| *F03D 7/02* | (2006.01) |

(52) U.S. Cl.
CPC . *H02J 4/00* (2013.01); *B60R 16/03* (2013.01); *B64D 47/00* (2013.01); *F03D 7/026* (2013.01); *F03D 9/00* (2013.01); *F03D 9/003* (2013.01); *B64D 2221/00* (2013.01)

(58) Field of Classification Search
CPC ....... H02J 4/00; B64D 2221/00; B64D 47/00; B60R 16/03; F03D 7/026; F03D 9/003; F03D 9/00
USPC .............................................. 307/9.1; 290/44
See application file for complete search history.

(56) References Cited

U.S. PATENT DOCUMENTS

| | | | |
|---|---|---|---|
| 5,013,929 A | 5/1991 | Dhyanchand | |
| 5,015,941 A | 5/1991 | Dhyanchand | |
| 6,018,233 A * | 1/2000 | Glennon | .......................... 322/22 |
| 2007/0267540 A1* | 11/2007 | Atkey et al. | ............ B64D 13/06 244/58 |

(Continued)

FOREIGN PATENT DOCUMENTS

| | | | | |
|---|---|---|---|---|
| JP | WO 2005112219 A1 * | 11/2005 | ................ | H02J 3/01 |
| WO | 2007/113312 A1 | 10/2007 | | |
| WO | WO 2007113070 A1 * | 10/2007 | ............. | B64D 13/06 |

*Primary Examiner* — Arnold Kinkead
(74) *Attorney, Agent, or Firm* — Baker & Hostetler LLP

(57) ABSTRACT

An electrical network of an aircraft and a method of operation comprises: an AC bus, a DC bus, a rectifier providing a DC voltage to the DC bus with the help of the AC bus, a plurality of bidirectional converters comprising two linkup points, each bidirectional converter being linked up at its first linkup point to the DC bus and being able to be linked up at its second linkup point to a load of the aircraft so as to power it, the network being able to be linked up to at least two generators each capable of delivering the AC voltage to the AC bus by the rectifier. At least one link links up at least one of the generators to the second linkup point of at least one of the bidirectional converters. The network can change generator with no cutoff and with no particular synchronization of the generators.

13 Claims, 9 Drawing Sheets

(56) References Cited

U.S. PATENT DOCUMENTS

| | | |
|---|---|---|
| 2008/0111420 A1* | 5/2008 | Anghel et al. .................. 307/9.1 |
| 2008/0252267 A1* | 10/2008 | Lando et al. .................... 322/90 |
| 2009/0091187 A1 | 4/2009 | Tardy |
| 2009/0195074 A1 | 8/2009 | Buiel |
| 2014/0333126 A1* | 11/2014 | Vyas ....................... B60R 16/03 307/9.1 |
| 2015/0184639 A1* | 7/2015 | Goessling ............... F03D 9/002 290/44 |

\* cited by examiner

ELECTRICAL NETWORK OF AN AIRCRAFT AND METHOD OF OPERATION OF THE ELECTRICAL NETWORK

CROSS-REFERENCE TO RELATED APPLICATIONS

This application is a National Stage of International patent application PCT/EP2010/062301, filed on Aug. 24, 2010, which claims priority to foreign French patent application No. FR 0904047, filed on Aug. 25, 2009, the disclosures of which are incorporated by reference in their entirety.

FIELD OF THE INVENTION

The invention relates to an electrical network of an aircraft and to a method of operation of the electrical network. The invention finds particular utility in respect of wide-bodied commercial craft which are including more and more onboard electrical equipment. The invention finds particular utility in respect of craft which use several alternative electrical power sources of diverse voltage and frequency, addressing requirements which vary according to the sources in terms of quality of the voltages provided.

BACKGROUND

The nature of onboard equipment varies greatly and its energy consumption varies greatly over time. By way of example, the internal air-conditioning and lighting systems are in almost continuous operation whereas redundant safety systems such as controls of airfoils, are used only exceptionally.

Generally, the craft employs three-phase electrical generators allowing power to be supplied to all the items of onboard electrical equipment, called loads subsequently. These generators deliver for example a voltage of 115 V at a frequency of 400 Hz to an AC bus of the craft. Aboard a craft there are for example one or more main generators. These are rotating electric machines driven by the engine or engines of the craft. There is also an auxiliary generator well known in the literature by the name "auxiliary power unit" driven by a turbine dedicated to this generator and supplying power to the craft when it is on the ground or in flight. Numerous airports employ ground power generators or ground-based electrical units making it possible to power the AC bus of the craft directly, so as to avoid calling upon the auxiliary generator. This ground power unit is for example installed in proximity to the craft on the ground by means of a truck or provided at the boarding gate The craft generally employs a rectifier making it possible to provide a DC voltage from the AC bus to a high-voltage DC bus well known in the literature by the name "high voltage direct current". The rectifier must be in particular compatible with the various generators that may power the AC bus.

In recent architectures, aircraft are becoming more and more electrical. In these architectures, certain loads of the craft are powered by converters with the help of the DC bus.

The multiplicity of generators making it possible to power the DC bus makes it necessary to dimension the linking equipment between a generator and the DC bus so as to limit, to within an acceptable span, the disturbances induced on the DC bus.

Moreover, the ground power units are generally rather intolerant to the disturbances rejected by the loads and notably by the rectifiers. International standards such as for example MIL STD 704 or ABD 100 define notably a span within which the voltage of the network must lie, a maximum rate of harmonics and a maximum imbalance between phases of the network.

It is moreover desirable to mutualize such linking equipment and to use for this purpose the rectifier powering the DC bus so as to provide the power to the DC bus with the help of any generator. This leads to this rectifier being dimensioned as a function of the generator that is most sensitive to disturbances.

Moreover, the quality of the power supply provided by the ground power units may vary from one airport to another.

To adapt to these various ground power units and to comply with the rates of rejected disturbances, provision must be made for appropriately dimensioned filters. These filters cause additional onboard weight. One of the aims of the invention is to reduce the dimensions of the filters associated with the mutualized linking equipment.

Another problem related to the multiplicity of generators is to maintain the aircraft's power supply without cutoff when a change of generator is effected, for example when the ground power unit is unplugged or else when the main generator replaces the auxiliary generator. The various generators are generally 115V or 230V AC generators with a frequency of 400 Hz. It is necessary to synchronize the frequencies and the phases of the generators during the change. Moreover, it is necessary to adapt the amplitudes of the voltages so that the power afforded by each can be correlated, this requiring delicate control of the various generators.

Another approach to cutoff-free transfer consists in rectifying the AC currents provided by the various generators (for example the ground unit and the auxiliary generator by 2 separate rectifiers). Cutoff-free connection is then carried out on the DC voltage after rectification. This approach no longer requires any synchronization in phase, frequency and amplitude of the AC generators, but uses rectifiers dedicated to the various generators, and requires high-voltage DC breakers.

SUMMARY OF THE INVENTION

Another aim of the invention is to allow the cutoff-free powering of the craft network during a change of generator without overtaxing the control of the various generators and without a rectifier dedicated to each generator. Stated otherwise the invention proposes to carry out power transfers from one generator to the other in a simple manner without power interruption.

For this purpose, the subject of the invention is an electrical network of an aircraft comprising:
 an AC bus,
 a DC bus,
 a rectifier providing a DC voltage to the DC bus with the help of the AC bus,
 a plurality of bidirectional converters comprising two linkup points, each bidirectional converter being linked up at its first linkup point to the DC bus and being able to be linked up at its second linkup point to a load of the aircraft so as to power it,
the network being able to be linked up to at least two generators each capable of delivering the AC voltage to the AC bus by means of the rectifier, characterized in that it furthermore comprises at least one link making it possible to link up at least one of the generators to the second linkup point of at least one of the bidirectional converters.

The subject of the invention is also a method of operation of an electrical network according to one of the preceding claims making it possible to alternate the provision of power to the aircraft from one generator to the other, characterized in that it consists in stringing together the following operations:

power the rectifier through a first of the two generators, connect a second of the two generators to at least one of the bidirectional converters and operate this or these converters so as to cancel the current originating from the first generator, disconnect the first generator, operate this or these converters so as to allow the connection of the second generator to the rectifier at zero current, connect the second generator to the rectifier.

By implementing the invention, the linking equipment common to the various generators may be for example a simple full-wave three-phase bridge or a 18 pulses autotransformer followed by a rectifier or even a device comprising controlled electronic breakers.

The invention makes it possible more generally to power loads having a high rate of harmonics with the help of voltage sources differing in amplitude, in frequency and in level of harmonic compatibility.

The invention makes it possible, in the case of a craft, part of whose loads must be powered with three-phase 400 Hz 115V, to power these loads on the ground directly through the three-phase 115V 400 HZ ground power unit while simultaneously connecting the same ground power unit to loads with high-current harmonics rates, current harmonics which are then compensated by the currents provided by one or more voltage inverters. This multiple connection of the ground power unit can also be applied to all the generators of the aircraft.

Moreover the auxiliary generator can also deliver a 230V or 115V three-phase voltage, at a frequency of 400 Hz. In the 230V case, an autotransformer will preferably be used to power the 400 Hz 115V loads.

The invention makes it possible optionally also to increase the frequency of the voltage delivered by the aircraft's generator or generators, this frequency no longer being constrained by that of elements outside the aircraft such as the ground power unit. By increasing the frequency of the generator, it is possible to decrease the mass thereof.

In one embodiment of the invention, the connection of the ground power units is not done solely on the AC bus of the craft. The correction of the rate of harmonics created by polluting loads is done with the help of one or more converters that may be used when the ground power unit is not powering the aircraft so as to power other loads at different instants of the craft's mission.

BRIEF DESCRIPTION OF THE DRAWINGS

The invention will be better understood and other advantages will become apparent on reading the detailed description of an embodiment given by way of example, the description being illustrated by the attached drawing in which.

For the sake of clarity, the same elements will bear the same labels in the various figures.

DETAILED DESCRIPTION

Figure 1:
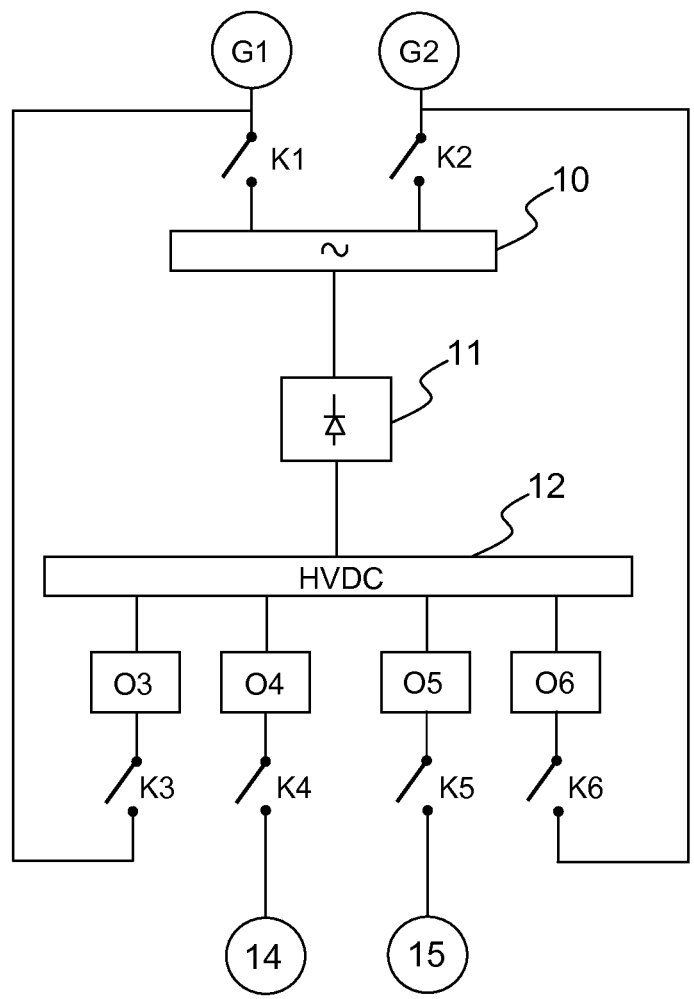
FIG. 1 schematically represents an exemplary electrical network installed aboard an aircraft.

FIG. 1 schematically represents an exemplary electrical network installed aboard an aircraft, notably a wide-bodied commercial craft. The aircraft may be powered by different generators, some internal such as main generators driven by the aircraft engines, an auxiliary generator, denoted APU and driven by a turbine dedicated to this generator or else a ground power unit placed at the disposal of the aircraft when the latter is on the ground. In FIG. 1, two generators G1 and G2 are represented. They may be internal or external to the aircraft. These generators provide an AC voltage for example a voltage of 115 V at a frequency of 400 Hz to an AC bus 10 of the craft. Disconnection means K1 make it possible to open the link joining the generator G1 to the AC bus 10. Likewise, disconnection means K2 make it possible to open the link joining the generator G2 to the AC bus 10. The electrical network also comprises a rectifier 11 connected to the AC bus 10 and making it possible to deliver a DC voltage to a high-voltage DC bus 12 denoted HVDC, the abbreviation standing for: "High Voltage Direct Current".

The DC bus 12 powers several energy converters O3 to O6 each intended to power a load by way of a link that may be interrupted by a breaker, respectively K3 to K6. The energy converters O3 to O6 are bidirectional. In the example represented, a load 14 is powered by the converter O4 and a load 15 is powered by the converter O5. The representation of FIG. 1 is schematic. In practice, the network may comprise a large number of converters. Moreover, a load may be powered by several converters or else a converter may power several loads. Certain loads may be powered under DC voltage and the associated converter then converts the voltage of the DC bus 12 into a voltage usable by the load considered. In a wide-bodied craft, there are numerous loads using an AC voltage of 115 V with a frequency of 400 Hz. Such are for example the loads 14 and 15 represented in FIG. 1. To power these loads, the converters O4 and O5 are inverters. Known inverters have the particular feature of being reversible and of rejecting only little disturbance when they are used as rectifiers.

According to the invention, at least one of the generators G1 or G2 may be linked up to at least one of the bidirectional converters O3 to O6. In the example represented, the generator G1 may be linked up to the converter O3 by way of the breaker K3 and the generator G2 may be linked up to the converter O6 by way of the breaker K6. Linkup between converter and generator is done between the generator considered G1 or G2 and the associated breaker K1 or K2.

In current service, just one of the two generators G1 or G2 provides electrical energy to the AC bus 10. To ensure cutoff-free transfer, with the help of the power supplied to the network by one of the generators, for example the generator G1, at least one of the converters O3 to O6 is used temporarily to power the DC bus through the second generator G2. Thereafter, it is possible to disconnect the generator G1 from the AC bus 10 and then connect the generator G2 to the AC network 10 and finally disconnect the generator G2 from the converter to which it was linked up, the converter O6 in FIG. 1. Stated otherwise, at least one of the generators G1 or G2 can power the DC bus 12 in part through the rectifier 11 and in part through the bidirectional converter O3 or O6 linked up to one of the generators G1 or G2. More precisely, the following operations are chained together:

power the rectifier 11 through the generator G1, the breaker K1 is closed and the breaker K2 is open;

connect the generator G2 to at least one of the bidirectional converters, in this instance the converter O6 by way of the breaker K6 and operate the converter O6 so as to cancel the current originating from the first generator G1;

disconnect the first generator G1 by opening the breaker K1;

operate the converter O6 so as to allow the connection of the generator G2 to the rectifier 11 at zero current;

connect the generator G2 to the rectifier by closing the breaker K2.

This stringing together of operations makes it possible to pass from the generator G1 to the generator G2. The link between the generator G1 and the converter O3 by way of the breaker K3 makes it possible to effect the reverse change, namely from the generator G2 to the generator G1.

Advantageously, to limit the power travelling through the converter O6 when it powers the DC bus 12 with energy received from the generator G2, the method of the invention consists:

in disconnecting part of the loads of the aircraft, for example the load 14, before connecting the generator G2 to the converter O6 and in reconnecting these loads after having connected the generator G2 to the rectifier 11.

In an aircraft, certain loads such as for example the cabin air compressors, steam cycle machines, recirculation fans, ovens and coffee machines are considered to be interruptible as opposed to the navigation instruments or to the controls of airfoils for example that are considered to be uninterruptible. The interruptible loads may be unballasted when passing from one generator to the other. It is thus possible to use a converter of reduced power to pass between the two generators G1 and G2.

Figure 2:
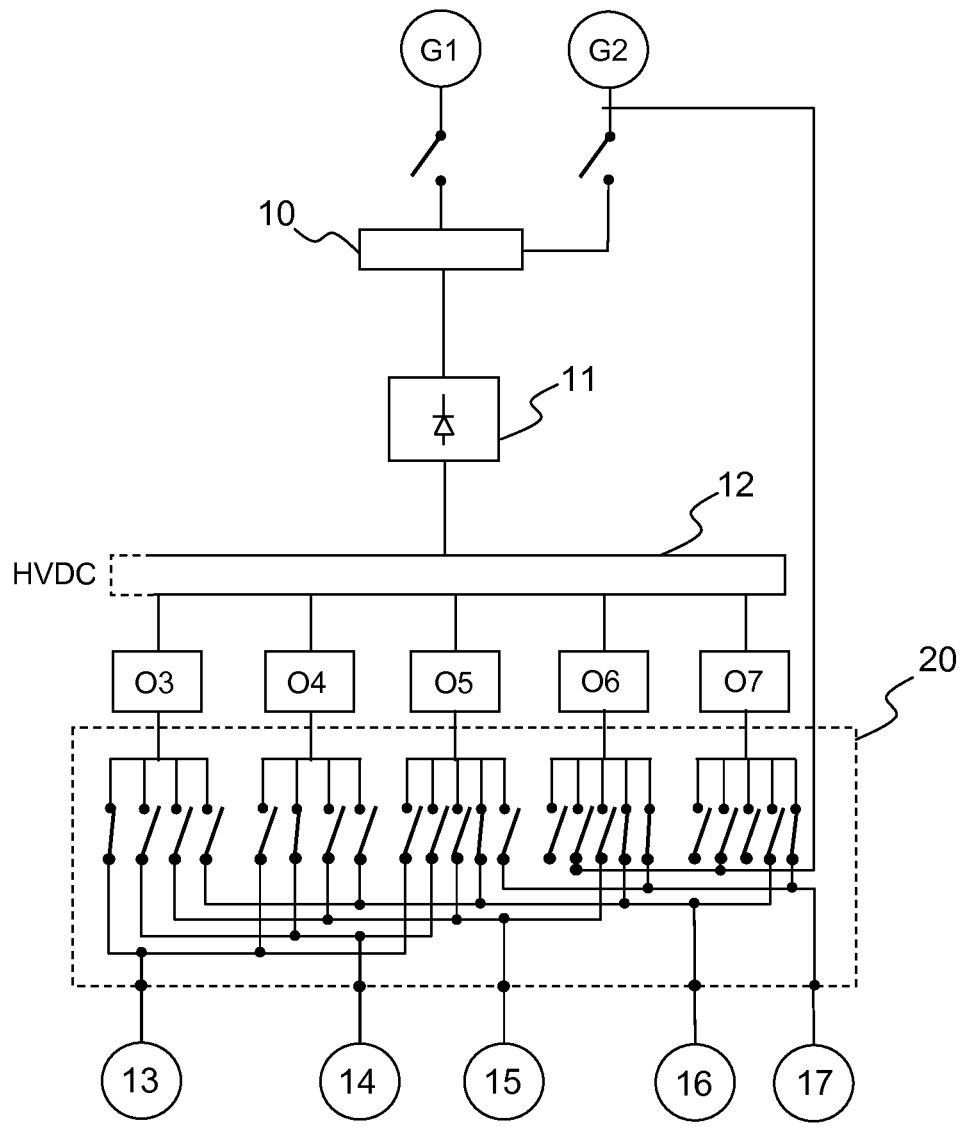
FIG. 2 schematically represents an exemplary embodiment of a converter implemented in the electrical network represented in FIG. 1.

FIG. 2 represents a variant embodiment in which several converters O3 to O7 form a common resource. Each converter may be assigned in real time to the various loads 13 to 17 as a function of the instantaneous requirement of each load 13 to 17 and as a function of the availability of each of the converters O3 to O7. For this purpose, the electrical network comprises splitting means 20 making it possible to vary the association between converters O3 to O7, loads 13 to 17 and generators G1 and G2. The splitting means 20 embrace the breakers K3 to K6 represented in a simplified manner in FIG. 1. Here in FIG. 2, one of the converters, for example the converter O4, may be connected to one or more loads, in this instance the loads 13 to 16, as a function of the requirement of the load and of the availability of the converter O4. Likewise, a load may receive energy from several different converters. Finally a generator may be linked up to several converters.

The association of the converters O3 to O7 and of the loads 13 to 17 is done as a function of the instantaneous current requirement and of the instantaneous mode of control of the load associated therewith. The mode of control of the load depends essentially on the type of load. By way of an example commonly implemented in a craft may be cited the regulation of speed, torque or position, anti-icing or deicing, operation at constant power and diverse strategies for engine control (defluxing, control with or without sensor).

The splitting means 20 comprise for example electrically controlled breakers making it possible to associate each converter with all the loads or with all the generators which are compatible with it. Compatible is to be construed as implying that several loads or generators can operate by means of a common power supply, for example a voltage of 115 V at a frequency of 400 Hz. Likewise the splitting means 20 make it possible to vary the association between the generator G2 and one out of several converters O6 or O7. The converters making it possible to deliver one and the same power supply form a group whose members are interchangeable. The various members of a group are advantageously identical. This reduces the costs of making the converters by standardizing their production and allows maintenance to be simplified by keeping only a single type of converter in stock.

The group is reconfigurable as a function of the instantaneous requirement of the loads that may be powered by this group. It is not necessary to employ a converter dedicated to each load. Indeed, the loads do not all operate simultaneously. The number of converters of one and the same group is defined as a function of the instantaneous maximum power that the set of loads associated with a group may consume. This power is less than the total of the maximum powers of each load. The splitting means 20 therefore make it possible to reduce the number of onboard converters and therefore the mass of these converters.

Moreover, reconfiguration makes it possible to improve the availability of the loads. Indeed, in the case of a converter fault, another converter of the same group can immediately take over to power the load. Certain critical loads such as for example airfoil controls can thus operate with a secure power supply without then requiring the redundancy of a converter dedicated solely to these controls. The set of converters of one and the same group then forms a common resource capable of powering a group of loads. Inside one and the same common resource, the various converters of which it is composed may be undifferentiated.

Direct powering of the loads 16 and 17 is possible, directly through the generator G2, without passing through the rectifier 11 and the DC bus 12 by using the splitting means 20. This possibility also allows limitation of the power transmitted by the converters O6 and O7 linked up to the generator G2 when passing from the generator G1 to the generator G2.

Moreover, the converter or converters O6 and O7 are used only sporadically to connect the generator G2 when passing to the generators G1. These converters are more generally used to power loads of the aircraft with the help of the DC bus 12, such as the loads 15 to 17, during operation with no change of generator.

More generally, the dimensioning and the number of converters is done essentially as a function of the aircraft's loads. Indeed, the connection of converters to the generators is done only rarely when it is desired to change generator. It is possible, in the course of these changes, to tolerate degraded operation or interruptible loads are unballasted.

It may be tolerated that the rectifier 11 rejects on the AC bus 10 more significant disturbances than those permitted by the standards cited above for the ground power unit. Indeed, by applying the invention to the ground power unit, for example the generator G2, it is possible to preserve the connection of the converters O6 and/or O7 to the ground power unit G2 during the entire time during which the ground power unit G2 is powering the aircraft. The converter or converters will be able to provide the ground power unit with the harmonic corrections necessary for compliance with the standards for disturbances.

So as not to overload the other figures, only one breaker has been represented associated with each converter. It is of course possible to implement splitting means 20 for the various alternative electrical networks represented so as to allow the real-time evolution of the allocation of each converter. For example, in FIG. 1, a converter used on the ground to correct the harmonics generated by the rectifier 11 to the ground power unit may very well be used subsequently in flight to power loads of the aircraft.

Figure 3:
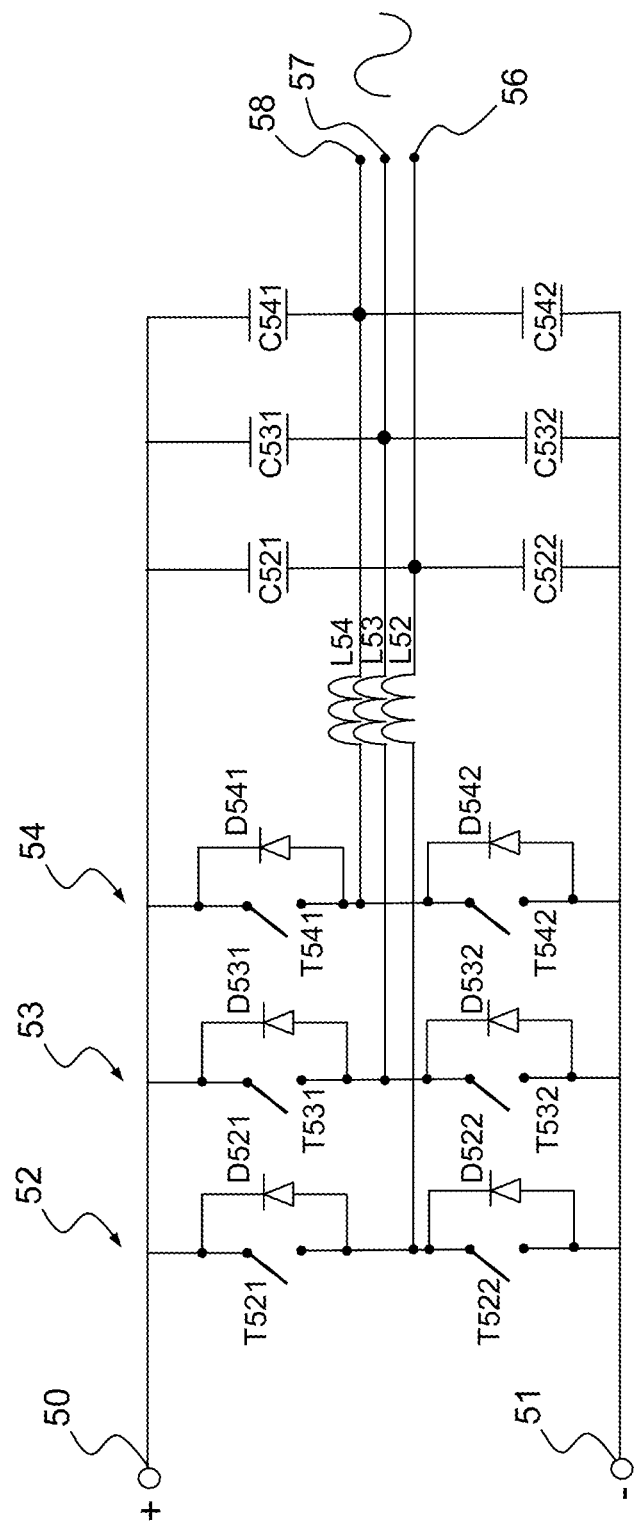
FIG. 3 allows better comprehension of the mutualization of the converters used in the electrical network.

FIG. 3 represents schematically and in a simplified manner an exemplary embodiment of a converter O3 to O7. The converter comprises two terminals 50 and 51, the terminal 50 being linked up to the positive pole of the DC bus 12 and the terminal 51 being linked up to the negative positive pole of the DC bus 12. Between the terminals 50 and 51, the converter comprises three branches 52, 53 and 54 each comprising two electronic breakers, T521 and T522 for the branch 52, T531 and T532 for the branch 53 and, T541 and T542 for the branch 54. In each branch 52, 53 and 54 the two breakers are joined in series and a diode is connected in parallel with each breaker. The label of the diode is D followed by the numerical part of the label of the breaker, for example the diode D 521 is connected to the terminals of the breaker T521. Each diode is connected in antiparallel fashion with respect to the direction of the current flowing in each breaker from the positive terminal 50 to the negative terminal 51. The breakers are for example all identical and of insulated-gate bipolar transistor type well known in the literature by the acronym IGBT for: "Insulated Gate Bipolar Transistor". In each branch 52, 53 and 54, at the common point of the two breakers, a choke, respectively L52, L53 and L54 is connected by its first terminal. A second terminal, 56, 57 and 58 of each choke, respectively L52, L53 and L54, allows the converter to power a three-phase load. Capacitors C521 to C542 are joined between one of the terminals 56, 57 and 58 and one of the terminals 50 and 51. When the electrical energy is provided to the converter by the DC bus 12, the converter operates as a voltage inverter. On the other hand, when the electrical energy is provided in AC form between the terminals 56, 57 and 58, for example by the generator G2, the converter operates as a current rectifier. To rectify the current provided by the ground power unit 15, it would have been possible to implement a simpler rectifier, for example based on a diode bridge. But this type of rectifier would have required the use of a transformer or autotransformer to raise the voltage provided by the ground power unit 15 (115V three-phase) up to the voltage (540V) of the DC bus 12. On the other hand, operation of the converter as a current rectifier makes it possible to raise the voltage without a transformer.

Figure 4:
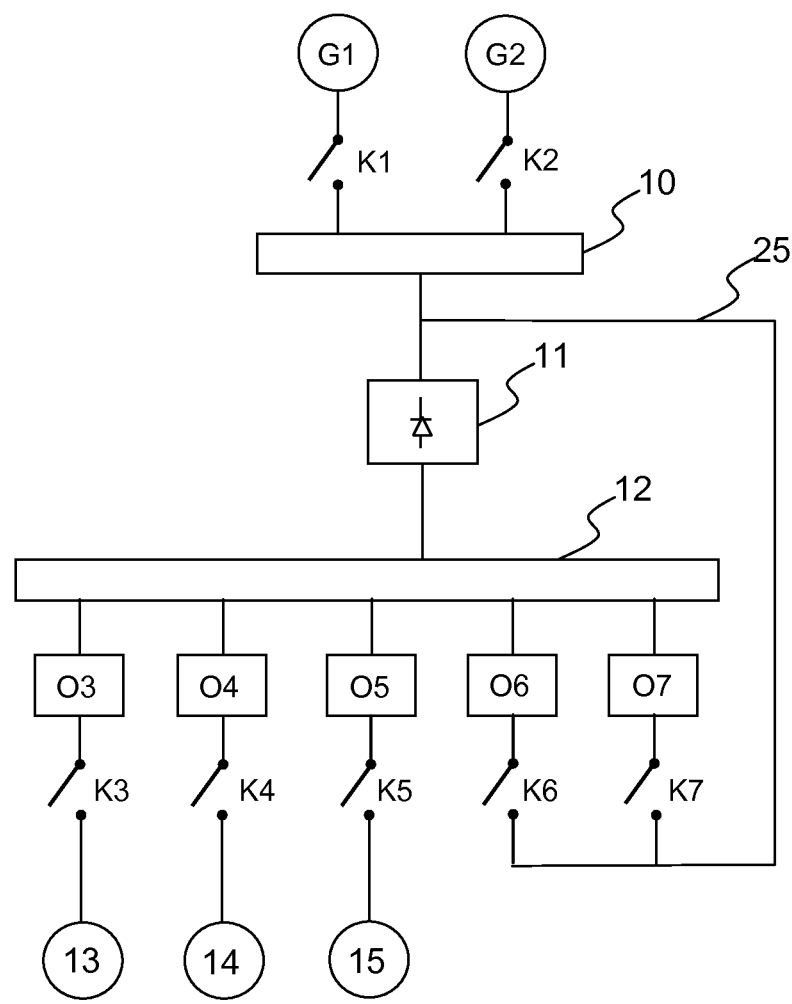
FIGS. 4 to 9 represent variants of the electrical network represented in FIG. 1.

FIG. 4 represents a variant of the electrical network of FIG. 1, in which variant more particular concern is paid to the correction of harmonics rejected towards one of the generators G1 or G2 by the rectifier 11. In this variant, a single link 25 may join the set of generators G1 and G2 to at least one of the converters O3 to O7. In FIG. 4, the link 25 may be linked up to the converters O6 and O7 by way of the breakers K6 and K7. In the variant represented, the link 25 is linked up between the breakers K1 and K2 and the rectifier 11 or else directly on the AC bus 10. This makes it possible to use the link 25 to correct the harmonics generated towards the AC bus 10 by the rectifier 11. The converter O6 and/or O7 joined to the generator G1 or G2 during operation is controlled so as to correct harmonics generated by the rectifier 11. This correction may be implemented whichever generator G1 or G2 is used to power the AC bus 10. Of course the converters O6 and O7 can also be used to power loads of the aircraft. The correction of harmonics may be dependent on the tolerance of the generator G1 or G2 to disturbances. For example, the generator G1 is an internal generator of the aircraft, such as one of the main generators or the auxiliary generator and the generator G2 is a ground power generator. The disturbances acceptable by the ground power generator are imposed by standards whereas the internal generators may be designed to be more tolerant to disturbances. When the ground power generator G2 is powering the aircraft, the converters O6 and O7 are used, for the correction of harmonics. When an internal generator G1 is powering the aircraft, it is possible to reduce the correction by using fewer converters, for example the converter O7 alone, i.e. no longer correct the harmonics. The converters that can be linked up to the link 25 and which are not used for the correction of harmonics may then be used for powering loads of the aircraft. Generally, during correction of harmonics the power travelling through the converter or converters ensuring this correction does not exceed a third of the power travelling through the rectifier 11.

Figure 5:
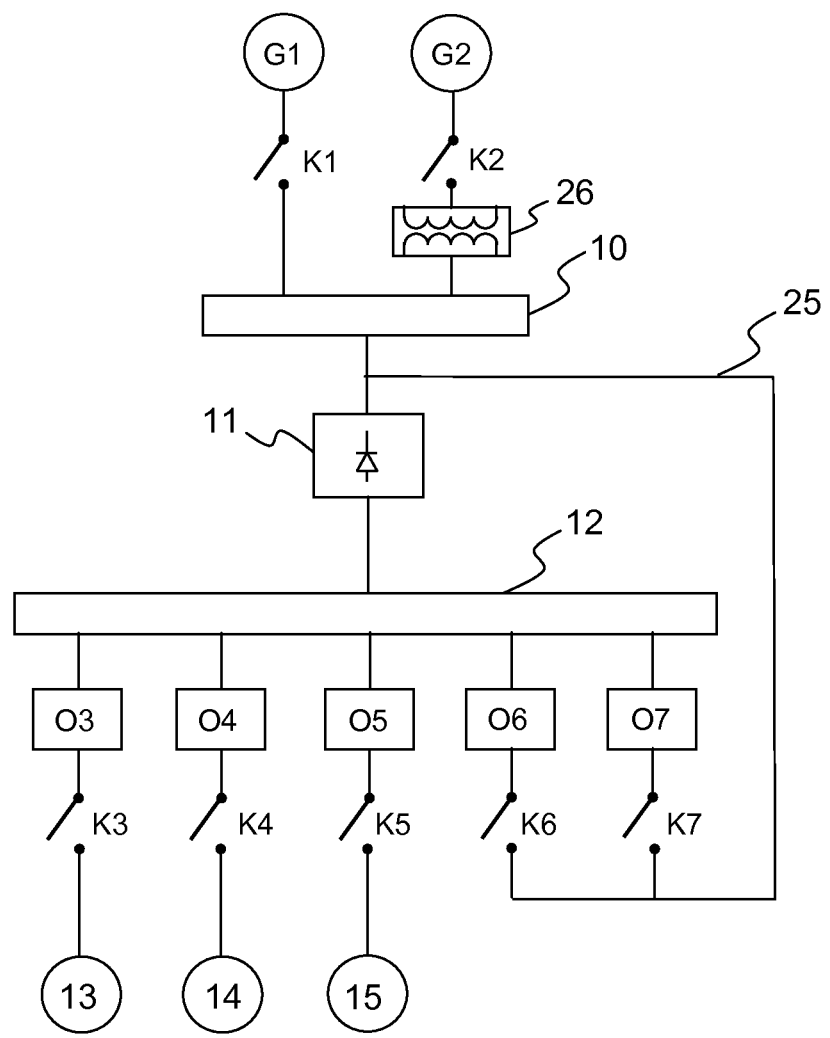

FIG. 5 represents a variant of the electrical network of FIG. 4, in which variant the generator G2 is linked up to the AC bus 10 by way of a transformer or autotransformer 26. This variant allows the use of a generator G2 delivering a different voltage from that of the AC bus 10. For example, certain AC buses of recent aircraft have a voltage of 230V at a frequency of 400 Hz, whereas ground power units generally have a voltage of 115V at a frequency of 400 Hz. This variant allows the use of such ground power units represented here by the generator G2.

Figure 6:
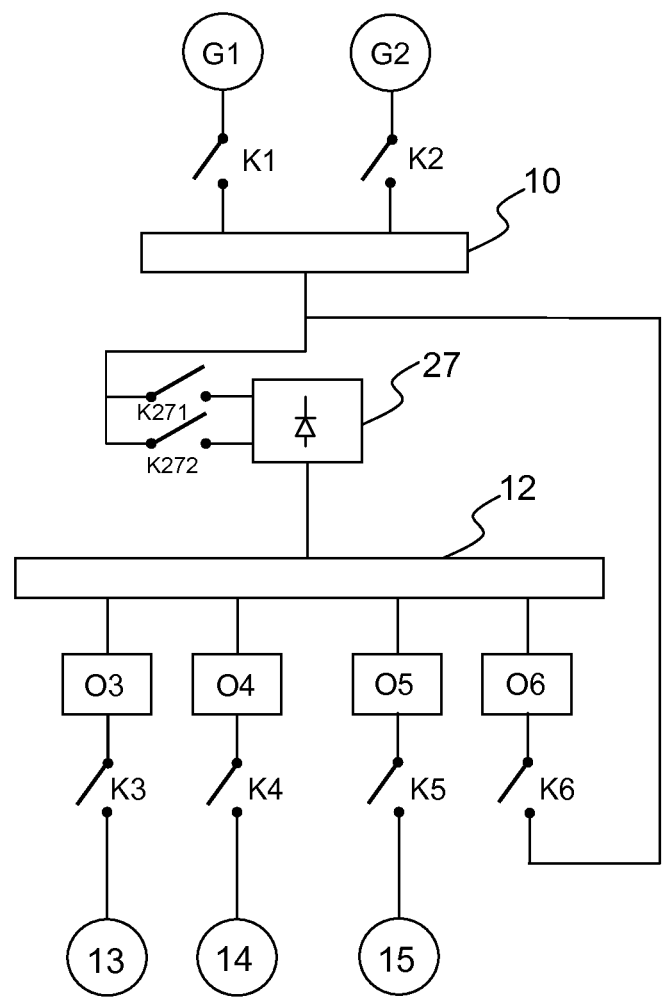

FIG. 6 represents a variant of the electrical network of FIG. 4, in which variant the rectifier 11 is replaced with an autotransformer-rectifier 27 with two inputs. For an output powering the DC bus 12 at 540V, the two inputs making it possible for example to use an AC voltage of the network 10 at 115V by way of the breaker K271 and an AC voltage of the network 10 at 230V by way of the breaker K272. The autotransformer part of the autotransformer-rectifier 27 implements for example a so-called 37° topology with dual 115V or 230V three-phase input. So, the breaker K271 is closed for a 115V generator such as a ground power unit or the breaker K272 is closed for a 230V generator such as an internal generator of the aircraft.

This variant is beneficial in respect of the starting of the internal generators which may be carried out at a lower voltage than the voltage that they deliver. This type of starting makes it possible to limit the so-called free-wheel losses in inverters used during starting. In this case, the internal generator is linked up by means of K271 for its starting before passing to K272 when it provides electrical power.

Figure 7:
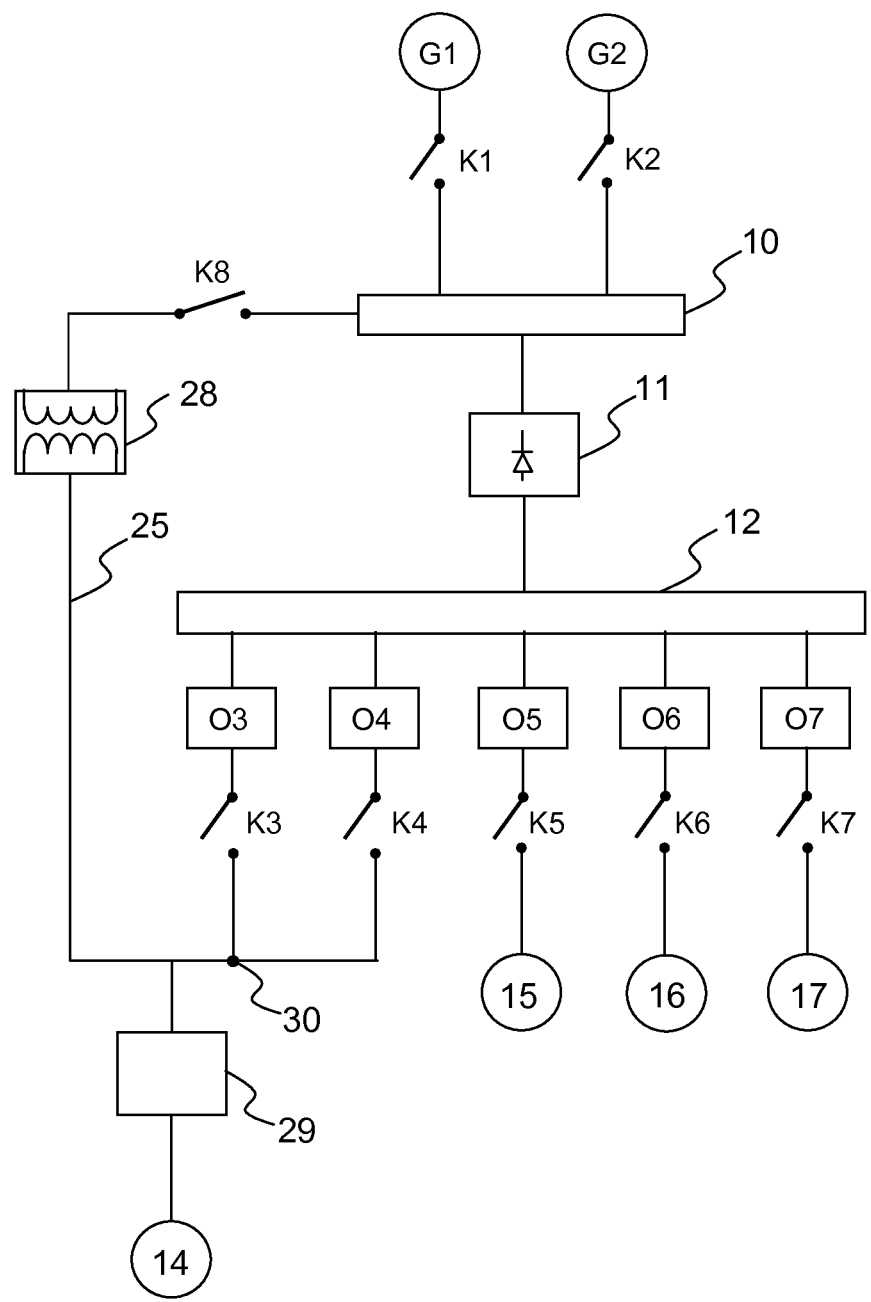

FIG. 7 represents a variant of the electrical network of FIG. 4, in which variant an autotransformer 28 is inserted into the link 25, the former making it possible to use an AC bus 10 whose voltage is different from the requirement of certain loads such as the load 14. For example, for a 230V AC bus, voltage delivered by the generators G1 and G2, the autotransformer 28 makes it possible to lower the voltage of the AC bus 10 so as to power a load 14 operating at 115V. It is of course possible to power several loads operating at 115V AC. The load 14 is powered at one and the same time by one or more inverters O3 and/or O4 and by the link 25. A filter 29 may be placed between the load 14 and a common point 30 of the link 25 and converters O3 and O4. A breaker K8 can open the link 25. The breaker K8 is for example disposed between the autotransformer 28 and the AC bus 10.

The load 14 is powered mainly via the autotransformer 28 and the role of the converters O3 and O4 is to correct the harmonics rejected by the autotransformer 28 on the AC bus 10. Less than a third of the power necessary for powering the load 14 travels through the converters O3 and O4, thus making it possible to reduce the number thereof.

Figure 8:
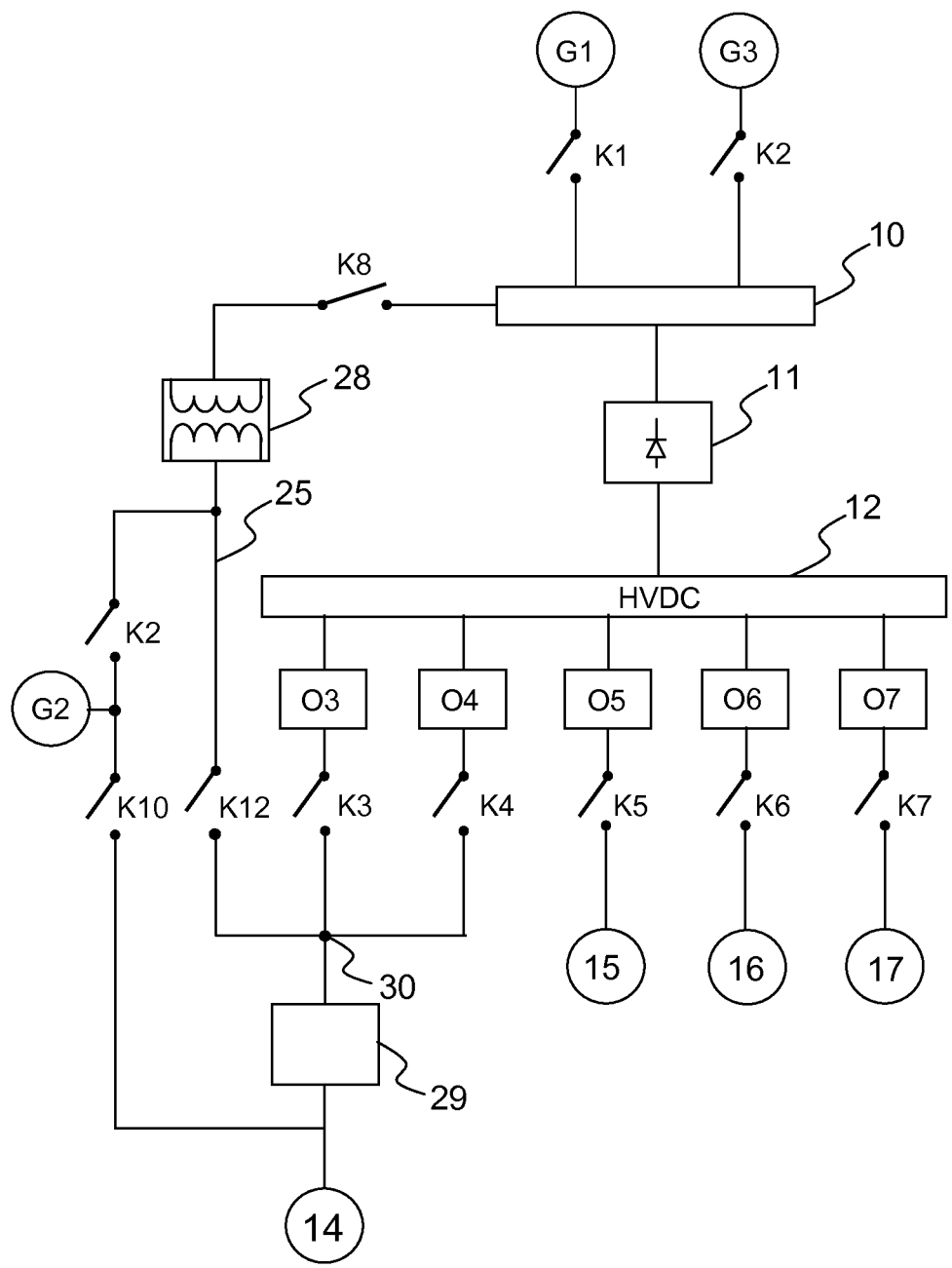

FIG. 8 represents a variant of the electrical network combining FIGS. 5 and 7. This variant is well adapted to the linking up of a ground power unit, here forming the generator G2. The ground power unit may be joined on the one hand to the AC bus 10 by way of the autotransformer 28 and on the other hand to the load 14. The breaker K2 makes it possible to interrupt the link between the generator G2 and the autotransformer 28. A breaker K10 makes it possible to interrupt the link between the generator G2 and the load 14. Moreover, a breaker K12 makes it possible to interrupt the link 25 between the point 30 and the autotransformer 28.

The ground power unit G2 powers on the one hand the AC bus 10, by way of the autotransformer 28, when the breakers K2 and K8 are closed and on the other hand, directly, loads which are compatible with it, for example 400 Hz 115V loads such as the load 14, when the breakers K10 is closed. Stated otherwise, the ground power unit G2 can power the load 14 directly without the power required for this purpose travelling through the rectifier 11 and through the DC bus 12. The link 25 makes it possible to correct the harmonics returned to the ground power unit G2 by the rectifier 11 via the autotransformer 28. This correction is effective when the breakers K12 and K3 and/or K4 are closed. As previously, less than a third of the power provided by the ground power unit G2 travels through the converter or converters O3 and/or O4 to ensure the correction.

Figure 9:
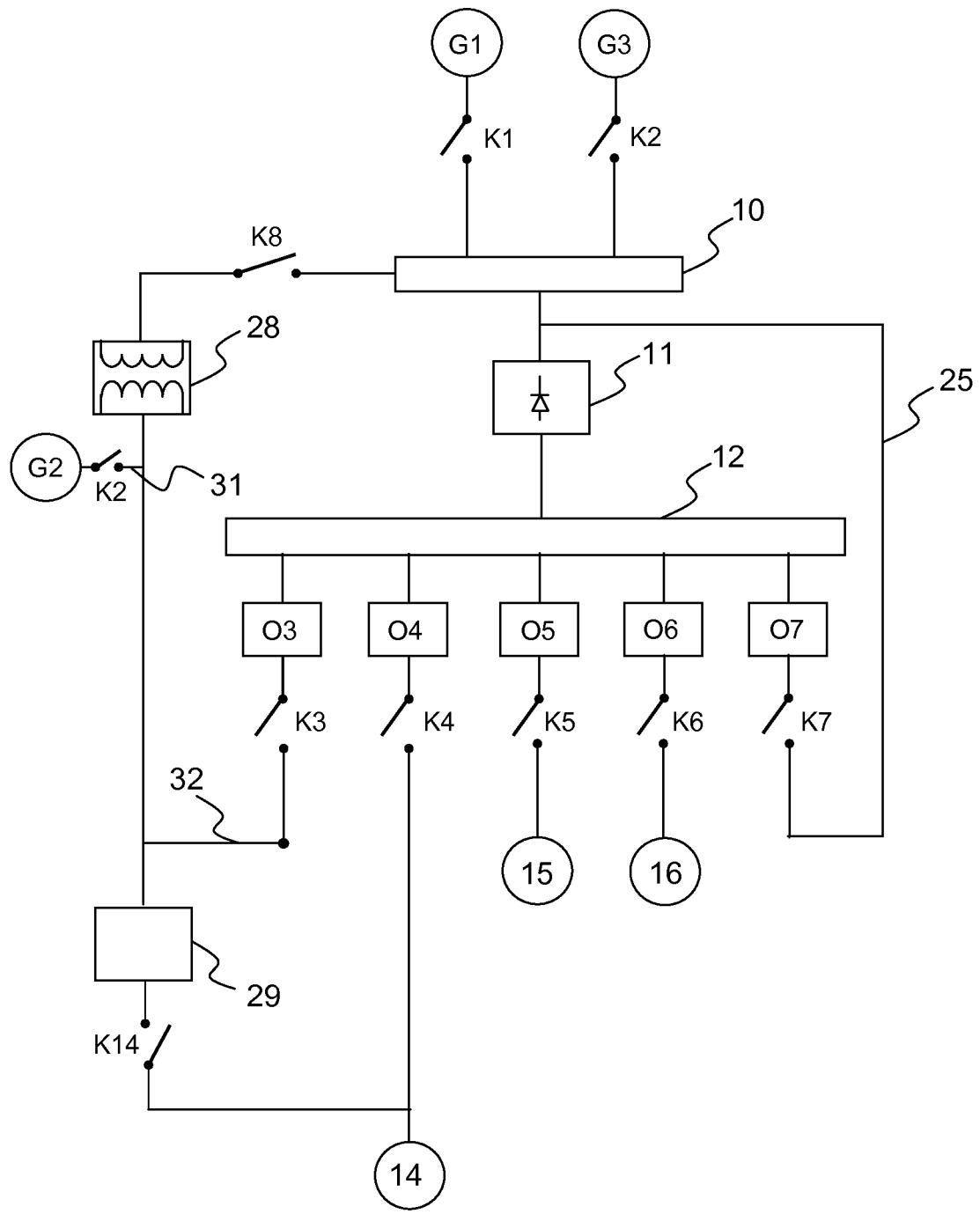

FIG. 9 represents an electrical network variant making it possible to ensure cutoff-free transfer between the power supply between two generators G2 and G2 as well as the correction of harmonics of all the generators joined to the AC bus 10. This variant is well adapted to the linking up of a ground power unit, here forming the generator G2. The ground power unit G2 may be joined on the one hand to the AC bus 10 by way of the autotransformer 28 and on the other hand to the load 14. The breaker K2 allows complete disconnection of the generator G2. The breaker K8 is for example disposed between the autotransformer 28 and the AC bus 10. The ground power unit G2 may be joined to the load 14 by way of the filter 29. A breaker K14 can interrupt the link between the filter 29 and the load 14. The converter O3 may be joined by way of the breaker K3 to the common point of the autotransformer 28 and of the breaker K2 by means of a link 32.

As previously, the link 25, here linked up to the converter O7, makes it possible to correct at the level of the AC bus 10 the harmonics generated by the rectifier 11. Less than a third of the power provided by the ground power unit G2 travels through the converter O7 to ensure the correction. Depending on the requirement in terms of correction of harmonics, other converters may be linked up to the link 25. The link 32 makes it possible to power the DC bus 12 through the ground power generator G2 by way of at least one converter, here the converter O3 during the phase of switchover from the generator G2 to one of the generators G1 or G3. As in the case of FIG. 1, this switchover is done with no cutoff for uninterruptible loads such as for example the load 15 and with no obligation to synchronize the generator G2 with the generator G1 or G3 taking over during switchover.

More precisely, to ensure switchover of the powering of the network from the generator G1 to the generator G2, the following operations are chained together:

power the rectifier 11 through the generator G2 via the autotransformer 28, the breakers K2 and K8 are closed and the breaker K1 is open; during this operation, the generator G2 also directly powers compatible loads, for example the 115V 400 Hz load 14; moreover, the breaker K7 is closed and at least the converter O7 ensures the correction of harmonics of the rectifier 11;

open the breaker K7 so as to momentarily interrupt the correction of harmonics and it is advantageously possible to interrupt the power supply to interruptible loads such as for example the load 15 by opening K5, while preserving the power supply to uninterruptible loads such as for example the load 16 by keeping K6 closed; if the load 14 is uninterruptible, the breaker K4 is closed to allow this load to be powered by the converter O4 during the transfer; the converter O4 is controlled so as to cancel the current in the breaker K14 in order to open it;

close the breaker K3 and control the converter O3 as a rectifier so as to obtain on the DC bus 12 a slightly greater voltage than that obtained through the rectifier 11 so as to cancel the current in the breaker K8;

the currents in the breakers K2, K8 and K14 being zero, these breakers are opened;

close the breakers K1, K8 and K14 so as to power the network through the generator G1 when this generator is ready, that is to say complies with the requirement in terms of voltage and frequency;

control the converters O3 and O4 so as to cancel the currents in the breakers K3 and K4 and open these breakers;

optionally close the breaker K5 so as to power the loads that have been interrupted;

optionally close the breaker K7 so as to correct the harmonics generated by the rectifier 11 if the generator G1 so requires.

Of course if the generator G1 does not require any correction of harmonics, the converter O7 may be used to power other loads of the aircraft, loads not represented in FIG. 9.

The invention claimed is:

1. A method of operation of an electrical network configured to alternate power to an aircraft from a first generator to a second generator, the electrical network including an AC bus, a DC bus, a rectifier coupling the AC bus to the DC bus, a plurality of bidirectional converters comprising two linkup points, at least one link to link the first generator to a first bidirectional converter, the method comprising:

powering the rectifier through a first generator, connecting the second generator to a second bidirectional converter and operating said second bidirectional converter to cancel a current originating from the first generator, delivering AC voltage to the AC bus by the first generator and the second generator, disconnecting the first generator, operating said second bidirectional converter to allow the connection of the second generator to the rectifier at zero current, connecting the second generator to the rectifier, providing a DC voltage to the DC bus using the AC bus via the rectifier, and powering a load of an aircraft by having each of the first and the second bidirectional converter being linked up at a respective first linkup point to the DC bus and being linked up at a respective second linkup point to the load.

2. The method according to claim 1, further comprising varying an association between said first bi-directional converter, said second bidirectional converter, the load and the first and the second generators using splitting means.

3. The method according to claim 2, wherein the association can vary in real time as a function of an instantaneous requirement of the load and of an availability of the first bi-directional converter, the second bidirectional converter and the first and the second generators.

4. The method according to claim 1, wherein at least one of the first and the second generators can power the DC bus in part through the rectifier and in part through the first or the second bidirectional converter linked up, respectively, to the first and the second generators.

5. The method according to claim 1, wherein at least one of the first and the second generators is outside the aircraft.

6. The method according to claim 1, further comprising:
linking up a link between the second linkup point of at least one of the first and the second bidirectional converters and the AC bus.

7. The method according to claim 6, wherein the link includes an autotransformer.

8. The method according to claim 1, wherein the disconnecting the first generator includes providing a breaker for said disconnecting such that the at least one link is linked up to a common point of the breaker and of the generator.

9. The method according to claim 1, wherein at least one of the first and the second generators is joined to the AC bus by a transformer or an autotransformer configured to adapt a voltage provided by the transformer or the autotransformer to a voltage of the AC bus.

10. The method according to claim 1, wherein the rectifier is associated with an autotransformer with two inputs configured to be linked up to the AC bus.

11. The method according to claim 1, wherein at least one of the first and the second generators are configured to power said load directly without a power required for said powering the load travelling through the rectifier and through the DC bus.

12. The method according to claim 1, further comprising:
disconnecting a part of the load of the aircraft before connecting the second of the two generators to at least one of the bidirectional converters and
reconnecting the part of the load after having connected the second generator to the rectifier.

13. The method according to claim 1, further comprising controlling the second bidirectional converter joined to the second generator to correct harmonics generated by the rectifier.

* * * * *